(12) United States Patent
Takahashi et al.

(10) Patent No.: US 11,273,777 B2
(45) Date of Patent: Mar. 15, 2022

(54) POWER SUPPLY CONTROL APPARATUS AND BATTERY UNIT

(71) Applicant: DENSO CORPORATION, Kariya (JP)

(72) Inventors: Shin Takahashi, Kariya (JP); Yamato Utsunomiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 16 days.

(21) Appl. No.: 16/730,286

(22) Filed: Dec. 30, 2019

(65) Prior Publication Data

US 2020/0136424 A1    Apr. 30, 2020

Related U.S. Application Data

(63) Continuation of application No. PCT/JP2018/022951, filed on Jun. 15, 2018.

(30) Foreign Application Priority Data

Jun. 30, 2017 (JP) .............................. JP2017-128618

(51) Int. Cl.
*B60R 16/033* (2006.01)
*H02J 7/14* (2006.01)
*H02J 7/34* (2006.01)
*H02J 9/06* (2006.01)

(52) U.S. Cl.
CPC .......... *B60R 16/033* (2013.01); *H02J 7/1423* (2013.01); *H02J 7/342* (2020.01); *H02J 9/061* (2013.01); *H02J 2310/40* (2020.01)

(58) Field of Classification Search
CPC ......... B60R 16/23–04; B60L 50/60–66; B60L 58/18–22; H02J 7/14–32
See application file for complete search history.

(56) References Cited

U.S. PATENT DOCUMENTS 4,999,775 A * 3/1991 Muraoka ............. B60R 21/0173
                                                         180/271
6,057,666 A * 5/2000 Dougherty ............. H02J 7/342
                                                         320/104

(Continued)

FOREIGN PATENT DOCUMENTS

JP        2015-149849 A    8/2015

*Primary Examiner* — Hal Kaplan
*Assistant Examiner* — David A Shiao
(74) *Attorney, Agent, or Firm* — Oliff PLC (57) ABSTRACT

A power supply control apparatus is applied to a power supply system. The power supply system includes: a first storage battery and a second storage battery that are connected in parallel to a power generator; and a switch that is provided further towards the first storage battery side than a connection point with the power generator on an electrical path that connects the first storage battery and the second storage battery is. A power supply control apparatus is started in accompaniment with input of a startup signal from outside and controls open and closed states of the switch. The power supply control apparatus includes: an abnormality determining unit that determines whether a startup signal abnormality in which the startup signal has not been received by the power supply control apparatus in a normal manner has occurred; and an abnormality operating unit that operates the switch to a closed state when the startup signal abnormality is determined to have occurred.

11 Claims, 5 Drawing Sheets

(56) References Cited

U.S. PATENT DOCUMENTS

| | | | | |
|---|---|---|---|---|
| 6,157,091 A | * | 12/2000 | Yoshida | H02J 13/0003 307/10.1 |
| 2005/0253458 A1 | * | 11/2005 | Omae | H01M 16/00 307/10.1 |
| 2013/0234504 A1 | * | 9/2013 | Morita | B60R 16/03 307/9.1 |
| 2015/0239411 A1 | * | 8/2015 | Nakajima | F02N 11/0866 307/10.6 |
| 2019/0176644 A1 | * | 6/2019 | You | B60L 50/64 |

* cited by examiner

POWER SUPPLY CONTROL APPARATUS AND BATTERY UNIT

CROSS-REFERENCE TO RELATED APPLICATIONS

The present application is a continuation application of International Application No. PCT/JP2018/022951, filed Jun. 15, 2018, which claims priority to Japanese Patent Application No. 2017-128618, filed Jun. 30, 2017. The contents of these applications are incorporated herein by reference in their entirety.

BACKGROUND

Technical Field

The present disclosure relates to a power supply control apparatus and a battery unit.

Background Art

An in-vehicle power supply system is mounted in a vehicle. As the in-vehicle power supply system, there is a system in which a lead storage battery and a lithium-ion storage battery are connected in parallel to a power generator such as an integrated starter generator [ISG]. The lead storage battery and the lithium-ion storage battery are connected in parallel to an electrical load.

SUMMARY

The present disclosure provides a power supply control apparatus that is applied to a power supply system. The power supply system includes: a first storage battery and a second storage battery that are connected in parallel to a power generator; and a switch that is provided further towards the first storage battery side than a connection point with the power generator on an electrical path that connects the first storage battery and the second storage battery is. The power supply control apparatus is started in accompaniment with input of a startup signal from outside and controls open and closed states of the switch. The power supply control apparatus determines whether a startup signal abnormality in which the startup signal has not been received by the power supply control apparatus in a normal manner has occurred, and operates the switch to a closed state when the startup signal abnormality is determined to have occurred.

DESCRIPTION OF THE EMBODIMENTS

As an in-vehicle power supply system that is mounted in a vehicle, there is a system in which a lead storage battery and a lithium-ion storage battery are connected in parallel to a power generator such as an integrated starter generator [ISG], and the lead storage battery and the lithium-ion storage battery are connected in parallel to an electrical load (see, for example, JP-A-2015-149849). In this in-vehicle power supply system, electric power is supplied to various electrical loads through selective use of the two storage batteries. In addition, each storage battery is appropriately charged by electric power from the power generator.

More specifically, a power supply control switch is provided on an electrical path that connects the lead storage battery and the power generator. When the power supply control apparatus is started by input of a startup signal that is generated by an ignition switch (IG switch) of the vehicle, the power supply control apparatus performs on and off states control of the power supply control switch. As a result, charging and discharge of each storage battery is performed.

Here, in the power supply control apparatus, for example, if a connector becomes detached or disconnection occurs, input of the startup signal may be unintentionally stopped even when the IG switch is turned on. For example, when the vehicle is traveling, the connector may become detached as a result of vibrations and input of the startup signal may be stopped. In this case, operation of the power supply control apparatus may be stopped and switch control may not be possible. Alternatively, the power supply control apparatus may not be started at a next vehicle startup. In addition, when the power supply control switch remains in an open state, charging of the lead storage battery by the power generator may not be possible even while the vehicle is traveling. A so-called dead-battery state may occur.

Here, in the power supply system described in JP-A-2015-149849, a normally closed relay is provided in parallel with a switch that is on the path that connects the lead storage battery and the power generator. In a state in which control by the control apparatus is stopped, charging of the lead storage battery by the power generator can be performed via the normally closed relay. However, for example, the normally closed relay is provided for the purpose of supplying dark current. The normally closed relay may not be capable of supplying sufficient charging power. In addition, to enable charging via the normally closed relay, physical size is required to be increased. Increase in cost that occurs in accompaniment with the increase in physical size becomes a concern. Furthermore, to achieve reduction in system cost, elimination of the normally closed relay itself that is provided in parallel with the switch is considered preferable.

It is thus desired to provide a power supply control apparatus that is capable of taking appropriate measures when a startup signal abnormality occurs, while achieving cost reduction in a power supply system, and a battery unit.

A first exemplary embodiment provides a power supply control apparatus that is applied to a power supply system. The power supply system includes: a first storage battery and a second storage battery that are connected in parallel to a power generator; and a switch that is provided further towards the first storage battery side than a connection point with the power generator on an electrical path that connects the first storage battery and the second storage battery is. The power supply control apparatus is started in accompaniment with input of a startup signal from outside and controls open and closed states of the switch. The power supply control apparatus includes: an abnormality determining unit that determines whether a startup signal abnormality in which the startup signal has not been received by the power supply control apparatus in a normal manner has occurred; and an abnormality operating unit that operates the switch to a closed state when the startup signal abnormality is determined to have occurred.

In the power supply system that includes the first storage battery and the second storage battery, while electric power can be supplied to the storage batteries from the power generator, the switch is provided on the electrical path that connects the first storage battery and the second storage battery such that the storage batteries can be selectively used as appropriate. The switch is opened and closed (that is, turned on and off) by the power supply control apparatus that is started in accompaniment with input of the startup signal from outside. However, when input of the startup signal is unintentionally stopped, switch control by the power supply control apparatus cannot be performed. Power supply from the power generator to the first storage battery, that is, charging of the first storage battery cannot be performed. Therefore, excessive decrease in a power-storage amount of the first storage battery becomes a concern.

In this regard, in the above-described configuration, whether the startup signal abnormality in which the startup signal has not been received by the power supply control apparatus in a normal manner has occurred is determined. When the startup signal abnormality is determined to have occurred, the switch is operated to the closed state. As a result, even if input of the startup signal is unintentionally stopped, power supply from the power generator to the first storage battery, that is, charging of the first storage battery can be performed. Decrease in the power-storage amount of the first storage battery can be suppressed. In addition, in the configuration, a normally closed relay or the like that is provided in parallel with the switch is no longer required. Therefore, increase in cost can be suppressed. Consequently, appropriate measures can be taken when the startup signal abnormality occurs, while cost reduction in the power supply system is achieved.

According to a second exemplary embodiment, the power supply control apparatus may communicate with another control apparatus via a communication line. The abnormality determining unit may determine that the startup signal abnormality has occurred when input of the startup signal is stopped in a state in which communication with the other control apparatus is being performed.

In a system in which communication is performed between a plurality of control apparatuses, whether the system is in a startup state can be determined based on whether communication is being performed. That is, when the startup signal is received by the power supply control apparatus in a state in which communication is being performed, a determination that an abnormality related to input of the startup signal has occurred can be made. Consequently, the startup signal abnormality can be appropriately determined to have occurred, and appropriate measures can be taken when the abnormality occurs.

According to a third exemplary embodiment, the power supply control apparatus may be applied to an in-vehicle power supply system that is mounted in a vehicle and in which communication via the communication line is performed in accompaniment with a power supply switch of the vehicle being turned on and the startup signal is supplied to the power supply control apparatus in accompaniment with the power supply switch being turned on. The abnormality operating unit may set the switch to the closed state as a result of communication being performed, and may set the switch to an open state as a result of communication not being performed, after the abnormality determining unit determines that the startup signal abnormality has occurred.

In the vehicle, the power supply switch (IG switch) is turned on and off based on usage of the vehicle by a user. In this case, when the power supply switch is turned on, that is, when the vehicle is traveling, the first storage battery and the power generator are preferably in a connected state so as to enable charging of the first storage battery by the power generator. Conversely, when the power supply switch is turned off, that is, when the vehicle is stopped, charging of the first storage battery by the power generator is not performed. Therefore, the connection between the first storage battery and the power generator may be blocked. Based on this perspective, after the startup signal abnormality is determined to have occurred, the switch is set to the closed state as a result of communication being performed and set to the open state as a result of communication not being performed. Consequently, power consumption that is required to set the switch to the closed state can be reduced when the vehicle is stopped.

According to a fourth exemplary embodiment, the power supply control apparatus may be applied to an in-vehicle power supply system that is mounted in a vehicle and in which communication via the communication line is performed in accompaniment with a power supply switch of the vehicle being turned on and the startup signal is supplied to the power supply control apparatus in accompaniment with the power supply switch being turned on. The power supply control apparatus may include a return determining unit that determines that input of the startup signal has returned to normal based on the startup signal being received by the power supply control apparatus in a state in which communication with the other control apparatus is not being performed after the startup signal abnormality is determined to have occurred.

When the startup signal abnormality occurs, a connector may be reconnected after the power supply switch is turned off. As a result, the startup signal abnormality may be resolved. In this case, the startup signal is received by the power supply control apparatus in a normal manner when the power supply switch is subsequently operated to on. Therefore, input of the startup signal can be determined to have returned to normal in the power supply control apparatus. Here, the configuration is such that, rather than the return-to-normal being determined simply based on input of the startup signal being resumed, the return-to-normal is determined based on input being resumed in a state in which communication is not being performed. Therefore, the determination regarding the return-to-normal is performed immediately after the power supply switch of the vehicle is turned on (immediately after an on-operation) and before start of communication. For example, after the startup signal abnormality is determined to have occurred, in a state in which input of the startup signal and stopping of input are repeated as a result of contact failure of the connector, the return-to-normal cannot be determined. A return determination can be appropriately performed after an off-operation of the power supply switch.

According to a fifth exemplary embodiment, the power supply control apparatus may include a return determining unit that determines that input of the startup signal has returned to normal based on an amount of time within which input of the startup signal is continued being equal to or greater than a predetermined amount of time, when the startup signal is subsequently received by the power supply control apparatus after the startup signal abnormality is determined to have occurred.

For example, in a state in which the connector is not correctly connected, input of the startup signal and stopping of input may repeatedly occur as a result of contact failure of the connector. In this regard, as a result of the above-described configuration, when the startup signal is subsequently received by the power supply control apparatus after the startup signal abnormality is determined to have occurred, input of the startup signal is determined to have returned to normal based on the amount of time within which input of the startup signal is continued being equal to or longer than a predetermined amount of time. In other words, even when the startup signal is subsequently received by the power supply control apparatus after the startup signal abnormality is determined to have occurred, if the duration of input is less than the predetermined amount of time, input of the startup signal is not determined to have returned to normal. Consequently, a return determination can be appropriately performed.

According to a sixth exemplary embodiment, the startup signals mat be respectively received from a plurality of routes. The abnormality determining unit may determine that the startup signal abnormality has occurred when input is stopped regarding only of a portion of the startup signals of the plurality of routes.

In the configuration in which the startup signals are respectively received by the power supply control apparatus via a plurality of routes, for example, input of a portion of the startup signals may be stopped and input of the other startup signals may be continued as a result of a portion of the connector becoming detached. Consequently, the startup signal abnormality can be appropriately determined to have occurred by input of only of a portion of the startup signals of the two routes being determined to have stopped.

According to a seventh exemplary embodiment, the power supply control apparatus may be applied to a power supply system that includes the switch as a first switch, and a second switch that is provided further towards the second storage battery side than the connection point on the electrical path. The abnormality operating unit operates the first switch to the closed state and the second switch to the open state when the startup signal abnormality is determined to have occurred.

When the startup signal abnormality is determined to have occurred, the first switch on a path that connects the first storage battery and the power generator is operated to the closed state. The second switch on a path that connects the second storage battery and the power generator is operated to the open state. Consequently, after the startup signal abnormality is determined to have occurred, charging of the first storage battery by the power generator can be appropriately performed while charging and discharge of the second storage battery are restricted.

Furthermore, in a battery unit that includes the above-described power supply control apparatus, a first terminal that is connected to the first storage battery, a second terminal that is connected to the power generator, a signal input terminal to which the startup signal is received, the switch that is provided on a connection path that connects the first terminal and the second terminal, and the second storage battery, appropriate measures can be taken when a startup signal abnormality occurs while cost reduction in the power supply system is achieved, in a manner similar to that described above.

Embodiments will hereinafter be described with reference to the drawings. According to the embodiments, an in-vehicle power supply system that supplies electric power to various apparatuses of a vehicle, in a vehicle that travels with an engine (internal combustion engine) serving as a drive source, is actualized. Here, sections among the embodiments that are identical or equivalent to each other are given the same reference numbers below. Descriptions of sections having the same reference numbers are applicable therebetween.

First Embodiment

Figure 1:
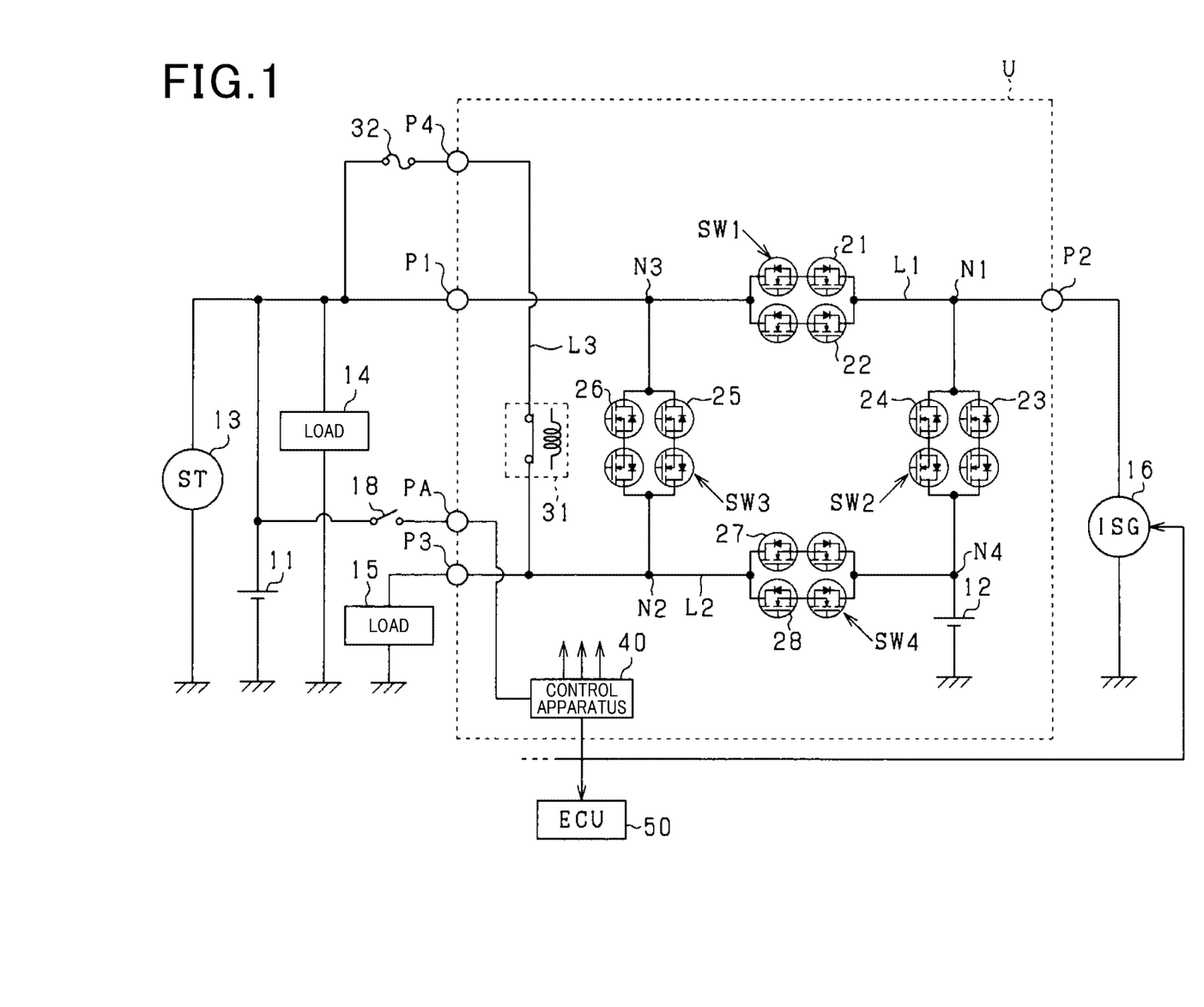
FIG. 1 is an electric circuit diagram of a power supply system according to a first embodiment.

As shown in FIG. 1, a power supply system of a first embodiment is a dual power supply system that includes a lead storage battery 11 and a lithium-ion storage battery 12. The lead storage battery 11 serves as a first storage battery. The lithium-ion storage battery 12 serves as a second storage battery. Power supply to a starter 13, various electrical loads 14 and 15, and a rotating electric machine 16 can be performed from the storage batteries 11 and 12. In addition, the storage batteries 11 and 12 can be charged by the rotating electric machine 16. In the present system, the lead storage battery 11 and the lithium-ion storage battery 12 are connected in parallel to the rotating electric machine 16. In addition, the lead storage battery 11 and the lithium-ion storage battery 12 are connected in parallel to the electrical loads 14 and 15.

Although a detailed description with reference to the drawings will be omitted, the lithium-ion storage battery 12 is configured as a substrate-integrated battery unit U that is housed in a housing case. The battery unit U includes output terminals P1, P2, P3, and P4. Among the output terminals P1, P2, P3, and P4, the output terminals P1 and P4 are connected to the lead storage battery 11, the starter 13, and the electrical load 14. The output terminal P2 is connected to the rotating electric machine 16. The output terminal P3 is connected to the electrical load 15. Here, the output terminal P1 corresponds to a first terminal. The output terminal P2 corresponds to a second terminal.

The electrical loads 14 and 15 have differing requirements regarding the voltages of the supplied electric power that is supplied from the storage batteries 11 and 12. The electrical load 15 includes a constant voltage-requiring load that requires the voltage of the supplied electric power to be stable, so as to be fixed or to at least vary within a predetermined range. In contrast, the electrical load 14 is a common electrical load other than the constant voltage-requiring load. The electrical load 15 can also be considered to be a protected load. In addition, the electrical load 15 is a load regarding which power supply failure is not permitted. The electrical load 14 can also be considered to be a load regarding which power supply failure is permitted, compared to the electrical load 15.

As specific examples of the electrical load 15 that is the constant voltage-requiring load, a navigation apparatus, an audio apparatus, a meter apparatus, and various types of electronic control units (ECUs) such as an engine ECU can be given. In this case, as a result of voltage variations in the supplied electric power being suppressed, occurrence of unnecessary resets and the like can be suppressed in the above-described apparatuses, and stable operation can be actualized. Traveling system actuators, such as an electric steering apparatus and a brake apparatus, may also be included as the electrical load 15. In addition, as specific examples of the electrical load 14, a seat heater, a heater for a rear window defroster, headlights, a front windshield wiper, a blower fan of an air-conditioning apparatus, and the like can be given.

The rotating electric machine 16 is a power generator that is provided with a motor function and includes a three-phase alternating-current motor and a motor control unit that controls driving of the motor. The rotating electric machine unit 16 is configured as an electromechanically integrated-type ISG. The rotating electric machine 16 provides a power generation function for performing power generation (re-generative power generation) through rotation of an engine output shaft or an axle, and a power running function for applying rotational force to the engine output shaft. For example, as a result of the power running function of the rotating electric machine 16, during idling stop control, restart of the engine that is automatically stopped is performed. The rotating electric machine 16 supplies generated power to the storage batteries 11 and 12 and the electrical loads 14 and 15.

Next, an electrical configuration of the battery unit U will be described.

The battery unit U includes a first electrical path L1 as an in-unit electrical path. The first electrical path L1 connects the output terminal P1 and the lithium-ion storage battery 12. The output terminal P2 is connected to a connection point N1 that is an intermediate point on the first electrical path L1. In this case, the first electrical path L1 is a path that electrically connects the lead storage battery 11 and the lithium-ion storage battery 12. The rotating electric machine 16 is connected to the connection point N1 on the first electrical path L1. A first switch SW1 is provided on a side further towards the lead storage battery 11 than the connection point N1 on the first electrical path L1. A second switch SW2 is provided on a side further towards the lithium-ion storage battery 12 than the connection point N1 on the first electrical path L1. The first electrical path L1 and an electrical path between N1-P2 are a large-current path through which an input/output current of the rotating electric machine 16 is assumed to flow. Energization between the storage batteries 11 and 12 and the rotating electric machine 16 is performed via this path.

In addition, a second electrical path L2 is provided in parallel between a branch point N3 and a branch point N4 on the first electrical path L1. The branch point N3 is between the output terminal P1 and the first switch SW1. The branch point N4 is between the second switch SW2 and the lithium-ion storage battery 12. The output terminal P3 is connected to a connection point N2 that is an intermediate point on the second electrical path L2. A third switch SW3 is provided further towards the lead storage battery 11 side than the connection point N2 on the second electrical path L2. A fourth switch SW4 is provided further towards the lithium-ion storage battery 12 side than the connection point N2 on the second electrical path L2. The second electrical path L2 and an electrical path between N2 and P3 are a small-current path through which a current that is smaller than that on the first electrical path L1 side is assumed to flow (that is, a small-current path that has a smaller allowable current than the first electrical path L1). Energization from the storage batteries 11 and 12 to the electrical load 15 is performed via the path.

In an operating state of the power supply system, as a result of the first switch SW1 and the second switch SW2 being selectively operated to a closed state, energization is performed via the first electrical path L1 between at least either of the lead storage battery 11 and the lithium-ion storage battery 12 and the rotating electric machine 16. In addition, as a result of the third switch SW3 and the fourth switch SW4 being selectively operated to the closed state, energization is performed via the second electrical path L2 between at least either of the lead storage battery 11 and the lithium-ion storage battery 12 and the electrical load 15.

The switches SW1 to SW4 are each configured using a semiconductor switching element such as a metal-oxide-semiconductor field-effect transistor (MOSFET), that is, a normally open-type switch. Specifically, for example, the first switch SW1 includes a switch unit 21 that is composed of semiconductor switching elements that are connected in series such that directions of parasitic diodes are opposite each other, and a switch unit 22 that is similarly composed of semiconductor switching elements that are connected in series such that the directions of the parasitic diodes are opposite each other. The first switch SW1 is configured such that the switch units 21 and 22 are connected in parallel. The other switches also have a similar configuration. That is, the second switch SW2 is configured by switch units 23 and 24 which are connected in parallel. The third switch SW3 is configured by switch units 25 and 26 which are connected in parallel. The fourth switch SW4 is configured by switch units 27 and 28 which are connected in parallel.

In the above-described switch units 21 to 28, because each switch unit includes the pair of semiconductor switching elements of which the directions of the parasitic diodes are opposite each other, for example, when the first switch SW is off (open), that is, when the semiconductor switching elements are off, a current flowing via the parasitic diodes is completely blocked. That is, a current unintentionally flowing via the electrical paths L1 and L2 can be prevented.

Here, in FIG. 1, the parasitic diodes are connected to each other by respective anodes. However, cathodes of the parasitic diodes may be connected together. As the semiconductor switching element, instead of the MOSFET, an insulated-gate bipolar transistor (IGBT), a bipolar transistor, or the like can be used. When the IGBT or the bipolar transistor is used, a diode that serves as a substitute for the parasitic diode may be connected in parallel to each semiconductor switching element.

Furthermore, a bypass path L3 that connects the output terminal P4 and the output terminal P3 is provided in the battery unit U. A bypass relay 31 is provided on the bypass path L3. That is, the bypass relay 31 is provided in parallel with the third switch SW3. The bypass relay 31 is a normally closed-type mechanical relay switch. A fuse 32 is provided on an extended line of the bypass path L3. Here, the fuse 32 may be provided on the bypass path L3 inside the unit. As a result of the bypass relay 31 being closed, the lead storage battery 11 and the electrical load 15 are electrically connected even when the third switch SW3 is turned off. For example, in a state in which an ignition (IG) switch that is a power supply switch of the vehicle is turned off, the switches SW1 to SW4 are turned off (closed). In this state, a dark current is supplied to the electrical load 15 via the bypass relay 31.

The battery unit U includes a power supply control apparatus 40 that controls on and off states (open and closed states) of the switches SW1 to SW4 and the bypass relay 31. The power supply control apparatus 40 is configured by a microcomputer that includes a central processing unit (CPU), a read-only memory (ROM), a random access memory (RAM), an input/output interface, and the like. When the IG switch is in the on-state, that is, when the system is in the operating state, the power supply control apparatus 40 operates the switches SW1 to SW4 to either of the open state and the closed state, and the bypass relay 31 to the open state, based on a request for energization to the electrical load 15 or the rotating electric machine 16. In this case, the power supply control apparatus 40 sets a switch command signal to an on-signal when any of the switches SW1 to SW4 is to be closed, and sets the switch command signal to an off-signal when any of the switches SW1 to SW4 is to be opened. In addition, the power supply control apparatus 40 sets a relay command signal to an on-signal when the bypass relay 31 is to be opened, and sets the relay command signal to an off-signal when the bypass relay 31 is to be closed.

An ECU 50 is connected to the power supply control apparatus 40. The ECU 50 serves as a control apparatus that is outside the battery unit. The power supply control apparatus 40 and the ECU 50 are connected by a communication network (communication line) such as a controller area network (CAN), and are capable of communicating with each other. Various types of data that are stored in the power supply control apparatus 40 and the ECU 50 can be shared therebetween. The ECU 50 is a high-order control apparatus in relation to the power supply control apparatus 40. The ECU 50 outputs commands related to control of open and closed states of the switches SW1 to SW4 and the bypass relay 31 to the power supply control apparatus 40 based on a power-storage state of each of the storage batteries 11 and 12, a driving state of the vehicle, and the like. As a result, in the present power supply system, charging and discharge are performed through selective use of the lead storage battery 11 and the lithium-ion storage battery 12.

Here, the power supply control apparatus 40 is started in accompaniment with input of a startup signal from outside the battery unit U. Specifically, the lead storage battery 11 is connected to a signal input terminal PA of the battery unit U with an IG switch 18 therebetween. In accompaniment with the IG switch 18 being operated to on, a startup signal of the high-level is received by the power supply control apparatus 40 via the signal input terminal PA. Then, for example, the power supply control apparatus 40 is started based on a rising edge of the startup signal being detected.

In addition, operation of the power supply control apparatus 40 is stopped in accompaniment with the startup signal becoming the low level as a result of the IG switch 18 being operated to off. However, in this case, the operating state is continued for a predetermined period after the startup signal falls. A predetermined post-processing is performed during the predetermined period. In the post-processing, for example, fault diagnosis of the switches and the like are performed as appropriate.

Here, other control apparatuses such as the ECU 50 are similarly started in accompaniment with the IG switch 18 being operated to on. Communication between the control apparatuses become possible in accompaniment with the startup of the control apparatuses.

Here, for example, when a connector becomes detached or disconnection occurs in the battery unit U, input of the startup signal is unintentionally stopped while the IG switch 18 is on. In this case, as a result of the operation of the power supply control apparatus 40 being stopped, switch control by the power supply control apparatus 40 cannot be performed. Charging of the storage batteries 11 and 12 by the rotating electric machine 16 cannot be performed. Consequently, a power-storage amount of the lead storage battery 11 decreases and so-called dead battery occurs. The vehicle may become incapable of traveling as a result of the dead battery.

In addition, when input of the startup signal is unintentionally stopped while the IG switch 18 is on, when the IG switch 18 is operated to on again after being operated to off, the startup signal may not become the high level (input may remain stopped) and the power supply control apparatus 40 may remain stopped. In this case as well, the vehicle may become incapable of traveling as a result of the lead storage battery 11 not being charged.

Therefore, according to the present embodiment, whether a startup signal abnormality in which the startup signal has not been received by the power supply control apparatus 40 in a normal manner has occurred is determined. In addition, when the startup signal abnormality is determined to have occurred, the first switch SW1 of the switches SW1 to SW4 within the battery unit U is operated to the closed state. According to the present embodiment, an abnormality determining unit and an abnormality operating unit are actualized by functions provided by the power supply control apparatus 40. Regarding determination of the startup signal abnormality, the power supply control apparatus 40 determines that the startup signal abnormality has occurred when input of the startup signal is stopped in a state in which communication with the ECU 50 is being performed.

Figure 2:
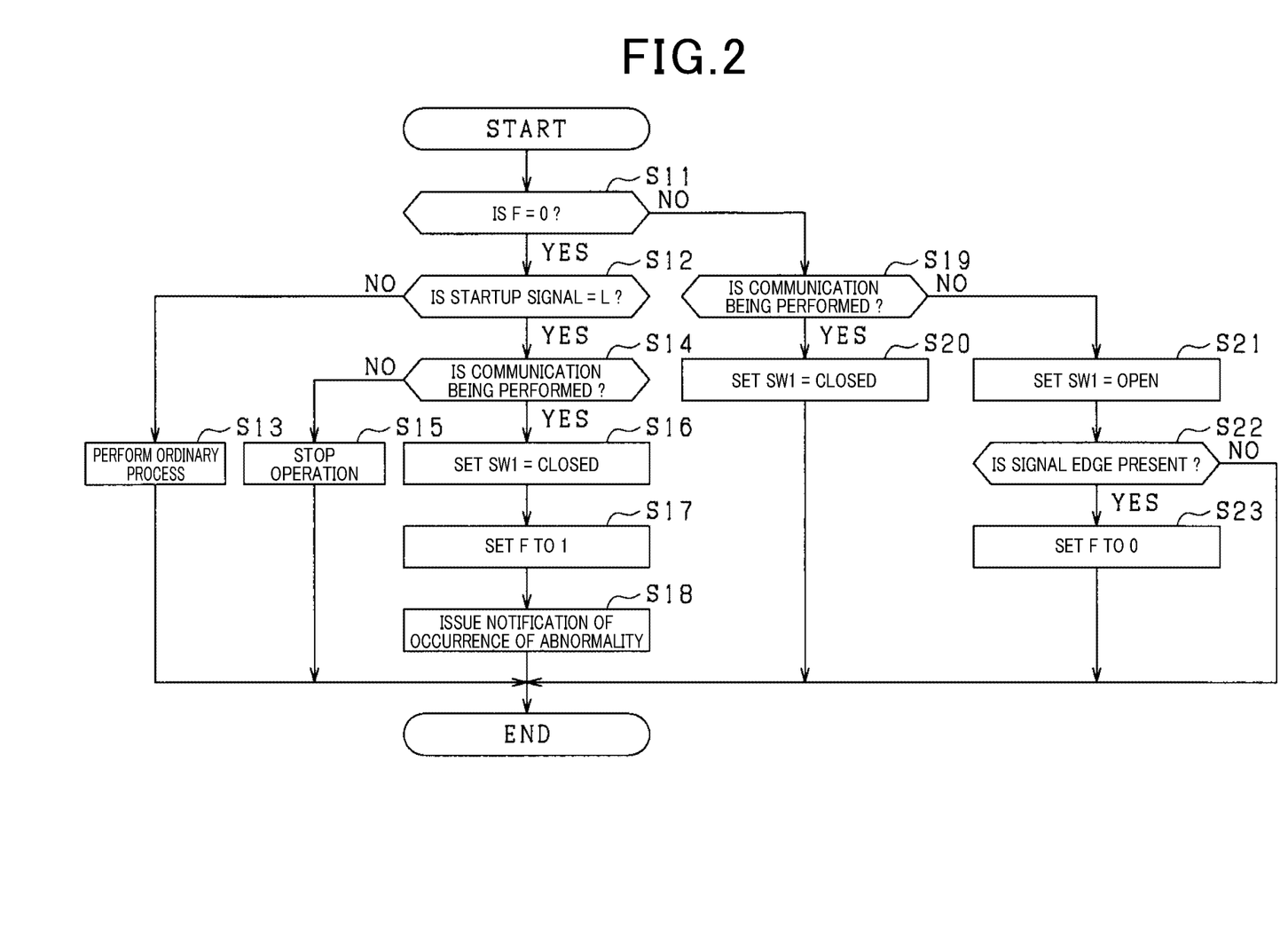
FIG. 2 is a flowchart of the steps in a process for switch control.

FIG. 2 is a flowchart of the steps in a process for switch control in the battery unit U. The present process is repeatedly performed by the power supply control apparatus 40 at a predetermined cycle.

In FIG. 2, at step S11, the power supply control apparatus 40 determines whether an error flag F is set to 0. The error flag F indicates whether the startup signal abnormality has occurred. Here, the error flag F being set to 0 indicates that the startup signal abnormality has not occurred. The error flag F being set to 1 indicates that the startup signal abnormality has occurred. When determined that F=0, the power supply control apparatus 40 proceeds to step S12. Alternatively, when determined that F=1, the power supply control apparatus 40 proceeds to step S19.

When determined that the error flag F is set to 0, at step S12, the power supply control apparatus 40 determines whether the startup signal is the low level. Then, when determined that the startup signal is the high level (NO at step S12), the power supply control apparatus 40 proceeds to step S13. At step S13, the power supply control apparatus 40 performs ordinary control as control of the switches SW1 to SW4. In the ordinary control, open and closed states of the switches SW1 to SW4 is controlled based on the state of the storage batteries 11 and 12, and a command from the ECU 50 that is the high-order control apparatus.

In addition, when determined that the startup signal is the low level (YES at step S12), the power supply control apparatus 40 proceeds to step S14. At step S14, the power supply control apparatus 40 determines whether communication via the communication network is being performed. Then, when determined that communication is not being performed (NO at step S14), the power supply control apparatus 40 proceeds to step S15. At step S15, the power supply control apparatus 40 performs a process to stop the operation of the power supply control apparatus 40 itself.

In addition, when determined that the startup signal is the low level and communication is being performed (YES at both steps S12 and S14), the power supply control apparatus 40 proceeds to step S16. At step S16, the power supply control apparatus 40 sets the first switch SW1, among the switches SW1 to SW4, to the closed state and sets the other second to fourth switches SW2 to SW4 to the open state. At subsequent step S17, the power supply control apparatus 40 determines that the startup signal abnormality has occurred and sets the error flag F to 1. However, in this case, even when the startup signal falls to the low level, the operation of the power supply control apparatus 40 is not stopped and the operating state thereof is continued.

At subsequent step S18, the power supply control apparatus 40 notifies the ECU 50 and the like of the occurrence of the startup signal abnormality, via the communication network. Here, a driver may be notified of the occurrence of the startup signal abnormality through sound, display, or the like. In the ECU 50 and the like, based on the notification of the occurrence of the startup signal abnormality, power running and power generation in the rotating electric machine 16 may be restricted.

In addition, when determined that the error flag F is set to 1, at step S19, the power supply control apparatus 40 determines whether communication is being performed. Then, when determined that communication is being performed, the power supply control apparatus 40 proceeds to step S20 and maintains the closed state (on-state) of the first switch SW1. When determined that communication is not being performed, the power supply control apparatus 40 proceeds to step S21 and transitions the first switch SW1 to the open state (off-state).

In addition, when determined that the error flag is set to 1 and communication is not being performed, at step S22, the power supply control apparatus 40 determines whether a rising edge of the startup signal is detected. Then, under a condition that the rising edge of the startup signal has been detected, at step S23, the power supply control apparatus 40 determines that input of the startup signal has returned to normal and resets the error flag F to 0.

Figure 3:
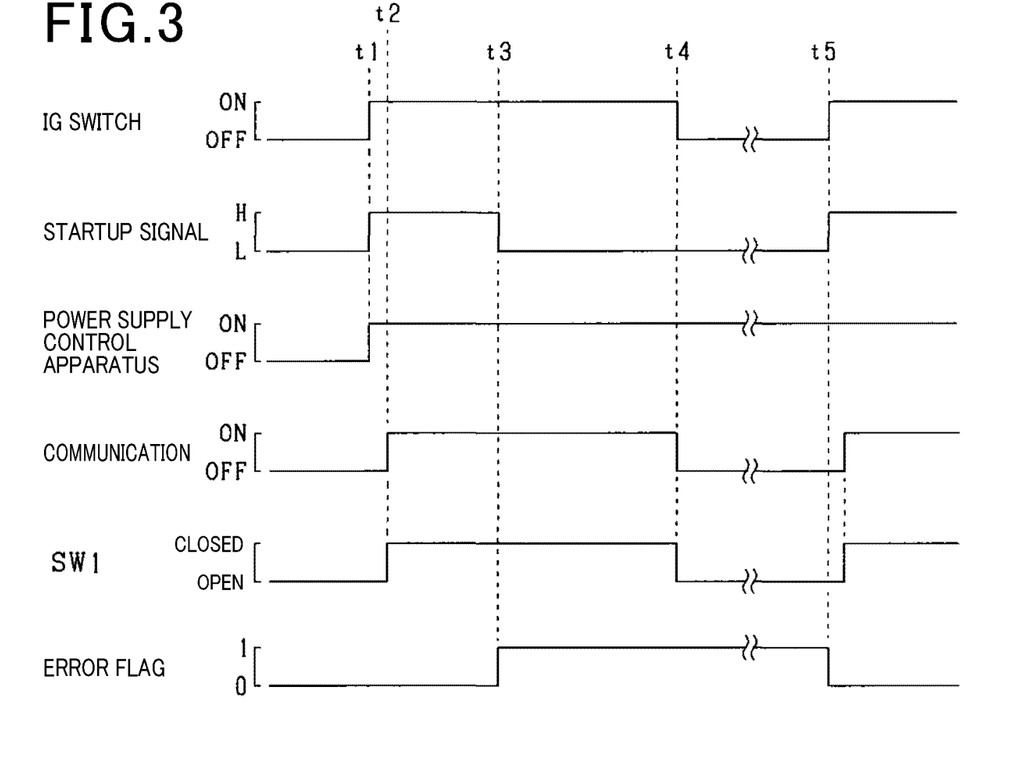
FIG. 3 is a timing chart showing the switch control in further detail.

FIG. 3 is a time chart that shows the above-described switch control in further detail. Here, a case in which input of the startup switch is unintentionally stopped after the IG switch 18 is operated to on is assumed.

In FIG. 3, at timing t1, the startup signal rises to the high level in accompaniment with the IG switch 18 being operated to on. In accompaniment, the power supply control apparatus 40 is started. Subsequently, at timing t2, communication via the communication network is started. In addition, at timing t2 and subsequent thereto, the switches SW1 to SW4 are opened-closed as appropriate. Here, in FIG. 3, the first switch SW1 is shown to be closed at all times, for convenience.

Subsequently, at timing t3, for example, input of the startup signal is stopped as a result of a connector becoming detached. At this time, based on the startup signal becoming the low level while communication is being continued, the startup signal abnormality is determined to have occurred. The error flag F is set to 1.

At timing t3 and subsequent thereto, stopping of the operation of the power supply control apparatus 40 is prohibited. In the operating state of the power supply control apparatus 40, only the first switch SW1 among the switches SW1 to SW4 is kept in the closed state. As a result of the first switch SW1 being kept in the closed state, charging of the lead storage battery 11 by the rotating electric machine 16 based on a charging request can be performed while the IG switch 18 is on, that is, while the vehicle is traveling.

Subsequently, when the IG switch 18 is turned off at timing t4, communication is stopped. Then, in accompaniment with the communication being stopped, the first switch SW1 is opened (turned off). However, at timing t4 and subsequent thereto, the power supply control apparatus 40 remains kept in the operating state. Power generation (charging of the lead storage battery 11) by the rotating electric machine 16 is not performed while the IG switch 18 is off, that is, while the vehicle is stopped. Therefore, even when the first switch SW1 is opened, issues regarding battery power do not arise. Reduced power consumption as a result of the first switch SW1 being opened is achieved.

Subsequently, at timing t5, the IG switch 18 is again operated to on. At this time, for example, when a user reconnects the connector after the previous IG-off, as shown in FIG. 3, at timing t5, the startup signal is received by the power supply control apparatus 40 in a normal manner. Therefore, input of the startup signal is determined to have returned to normal based on the rising edge of the startup signal. The error flag F is reset to 0.

Here, unlike the example in FIG. 3, a case in which, when the connector becomes detached, this detached state is left as is even during IG-off can be considered. In this case, input of the startup signal (input of a rising edge) is not performed at a next IG-on. However, when the startup signal abnormality is determined to have occurred, as described above, because the power supply control apparatus 40 is subsequently kept in the operating state, charging of the lead storage battery 11 by the rotating electric machine 16 can be performed after the next IG-on (at timing t5 and subsequent thereto in FIG. 3).

According to the present embodiment described in detail above, the following excellent effects are achieved.

The configuration is such that whether the startup signal abnormality in which the startup signal has not been received by the power supply control apparatus 40 in a normal manner has occurred is determined. When the startup signal abnormality is determined to have occurred, the first switch SW1 is operated to the closed state. As a result, even when input of the startup signal to the power supply control apparatus 40 is unintentionally stopped, power supply to the lead storage battery 11 from the rotating electric machine 16, that is, charging of the lead storage battery 11 can be performed. Decrease in the power-storage amount of the lead storage battery 11 can be suppressed. In addition, in this configuration, a normally closed relay or the like that is provided in parallel with the first switch SW1 is not required. Therefore, increase in cost can be suppressed. As a result, appropriate measures can be taken when a startup signal abnormality occurs, while cost reduction in the power supply system is achieved.

The configuration is such that, when input of the startup signal is stopped in a state in which communication with the ECU 50 (another control apparatus) is being performed, the startup signal abnormality is determined to have occurred. In this case, the startup signal abnormality can be appropriately determined to have occurred through determination of whether the system is in a startup state based on whether communication is being performed. Furthermore, appropriate measures can be actualized when the abnormality has occurred.

As a result of the start signal abnormality being determined with reference to the communication state as described above, the desired abnormality determination can be appropriately performed even without addition of a signal line or the like for abnormality determination.

The configuration is such that, after the startup signal abnormality is determined to have occurred, when communication is being performed, the first switch SW1 is set to the closed state. When communication is not being performed, the first switch SW1 is set to the open state. As a result, power consumption that is required to keep the first switch SW1 in the closed state can be reduced when the vehicle is stopped.

When the startup signal abnormality occurs, a connector may be reconnected after the IG switch 18 is turned off and the startup signal abnormality may thereby be resolved. In this case, when the IG switch 18 is operated to on, the startup signal is received by the power supply control apparatus 40 in a normal manner. Therefore, a determination that input of the startup has returned to normal can be performed in the power supply control apparatus 40. Here, the configuration is such that, rather than the return-to-normal simply being determined based on input of the startup signal being resumed, the return-to-normal is determined based on input being resumed in a state in which communication is not being performed. Therefore, the determination regarding the return-to-normal is performed immediately after the IG switch 18 is turned on (immediately after an on-operation) and before start of communication. Therefore, for example, after the startup signal abnormality is determined to have occurred, in a state in which input of the startup signal and stopping of input are repeated as a result of contact failure in the connector, the return-to-normal cannot be determined. A return determination can be appropriately performed after an off-operation of the IG switch 18 is performed.

When determined that the startup signal abnormality has occurred, the first switch SW1 is operated to the closed state and the second switch SW2 is operated to the open state. As a result, after the startup signal abnormality is determined to have occurred, charging of the lead storage signal 11 by the rotating electric machine 16 can be appropriately performed while charging and discharge of the lithium-ion storage battery 12 is restricted.

Other embodiments will be described below, mainly focusing on differences with the first embodiment.

Second Embodiment

According to a second embodiment, a following configuration is used regarding a return-to-normal determination after the startup signal abnormality is determined to have occurred. That is, after the startup signal abnormality is determined to have occurred, when the startup signal is subsequently received by the power supply control apparatus 40, the power supply control apparatus 40 determines that input of the startup signal has returned to normal based on an amount of time within which input of the startup signal is continued being equal to or greater than a predetermined amount of time.

Figure 4:
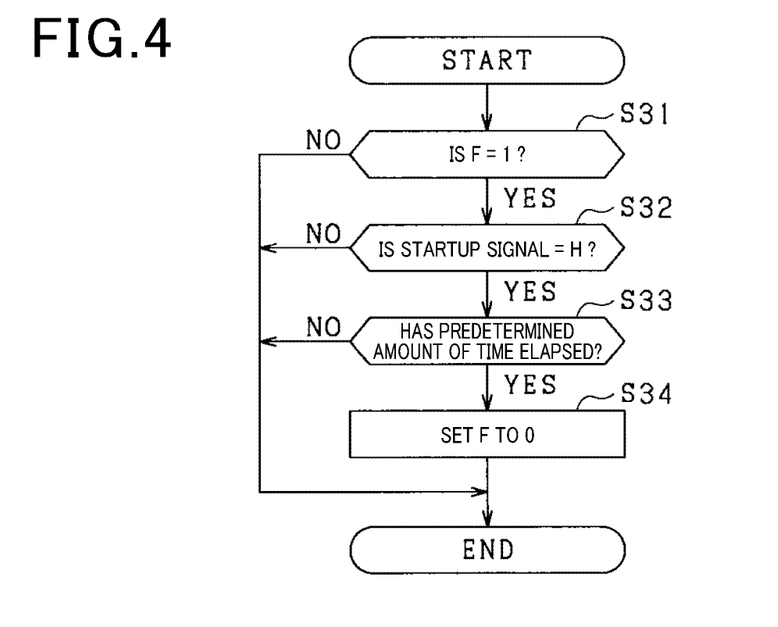
FIG. 4 is a flowchart of the steps in a process for return-to-normal determination according to a second embodiment.

FIG. 4 is a flowchart of the steps in a process for the return-to-normal determination. The present process is repeatedly performed by the power supply control apparatus 40 at a predetermined cycle. Here, FIG. 4 shows only processes related to the return-to-normal determination, within the series of processes for switch control.

In FIG. 4, at step S31, the power supply control apparatus 40 determines whether the error flag F is set to 1. When determined that F=1, the power supply control apparatus 40 proceeds to subsequent step S32. At step S32, the power supply control apparatus 40 determines whether the startup signal is the high level. Then, when determined that the startup signal is the high level, at step S33, the power supply control apparatus 40 determines whether a duration from when the startup signal has become the high level is equal to or greater than a predetermined amount of time TA. Then, when determined YES at step S33, the power supply control apparatus 40 determines that input of the startup signal has returned to normal and resets the error flag F to 0.

Figure 5:
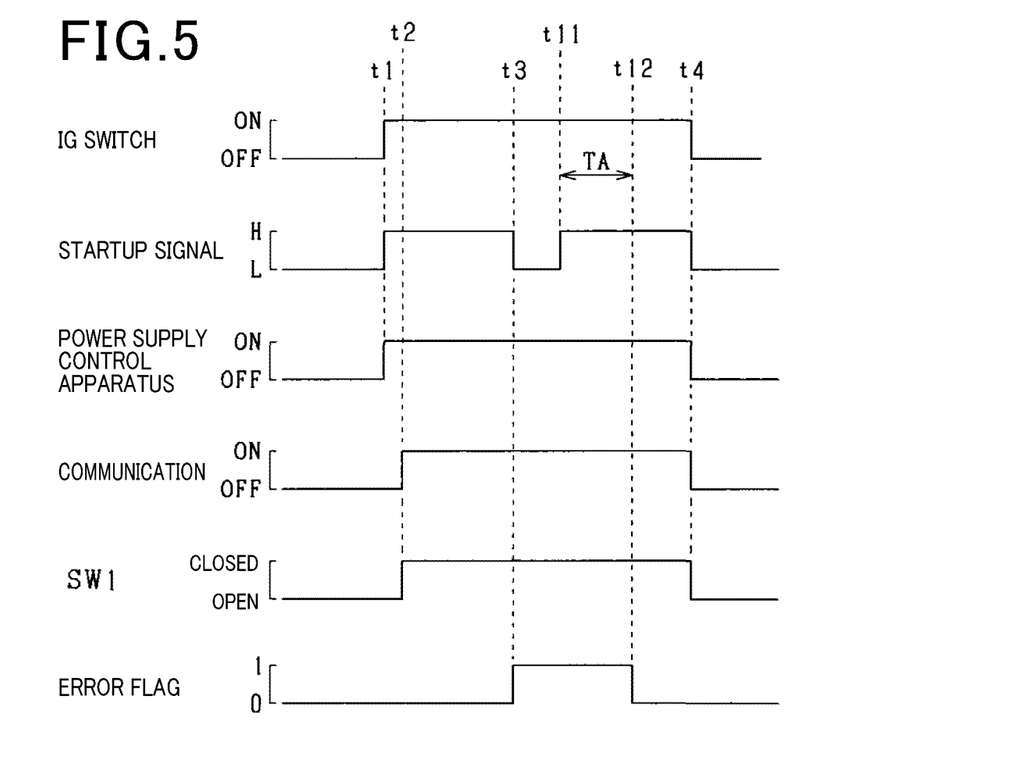
FIG. 5 is a timing chart showing the return-to-normal determination in further detail.

FIG. 5 is a time chart that shows the process for the return-to-normal determination in further detail. Here, in FIG. 5, in a manner similar to that in FIG. 3, described above, at timing t1, the power supply control apparatus 40 is started in accompaniment with input of the startup signal. At timing t2 and subsequent thereto, communication via the communication network is performed. In addition, at timing t3, input of the startup signal is unintentionally stopped. At timing t4, the IG switch 18 is turned off.

Here, in particular, after input of the startup signal is unintentionally stopped, before the IG switch 18 is turned off, that is, during a period from timing t3 to timing t4, at timing t11, the startup signal is received by the power supply control apparatus 40 again. Then, after the startup signal is received by the power supply control apparatus 40 again, as a result of the predetermined amount of time TA elapsing while the startup signal remains the high level, at timing t12 that is the timing at which the predetermined amount of time TA elapses, the error flag F is reset to 0.

However, although not shown in FIG. 5, after the startup signal is received by the power supply control apparatus 40 again, if input of the startup signal is stopped again before the elapse of the predetermined amount of time TA, the error flag F is held at 1. That is, even when the startup signal is subsequently received by the power supply control apparatus 40 after the startup signal abnormality is determined to have occurred, if the duration of input is less than the predetermined amount of time TA, input of the startup signal is not determined to have returned to normal.

As a result of the above-described configuration, for example, in a state in which input of the startup signal and stopping of input are repeated as a result of contact failure of a connector, the return-to-normal is not determined to have occurred. Consequently, the return determination can be appropriately performed.

Third Embodiment

According to a third embodiment, the configuration is such that startup signals are respectively received by the power supply control apparatus 40 via a plurality of routes. When input is stopped regarding only of a portion of the startup signals of the plurality of routes, the startup signal abnormality is determined to have occurred.

Figure 6:
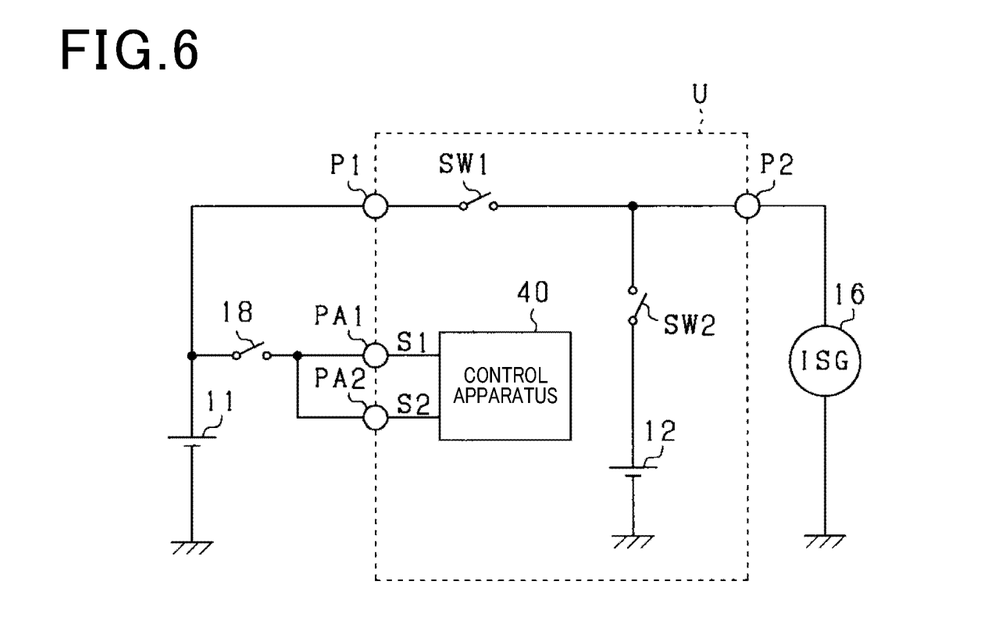
FIG. 6 is an electric circuit diagram of a power supply system according to a third embodiment.

FIG. 6 is a circuit diagram of a configuration of a power supply system according to the present embodiment. Here, the power supply system according to the present embodiment is substantially identical to that in FIG. 1, described above. However, in FIG. 6, a portion of the configuration is omitted.

In FIG. 6, the battery unit U is provided with two signal input terminals PA1 and PA2. Each of the signal input terminals PA1 and PA2 is connected to the IG switch 18. Startup signals S1 and S2 are respectively received by the power supply control apparatus 40 via the signal input terminals PA1 and PA2. Other configurations are identical to those in FIG. 1. Here, regarding a connector that is provided in the battery unit U, in a plurality of pin arrays, pins that serve as the signal input terminal PA1 and pins that serve as the signal input terminal PA2 may be provided in positions that are away from each other. Alternatively, the signal input terminals PA1 and PA2 may be provided in differing connectors.

Figure 7:
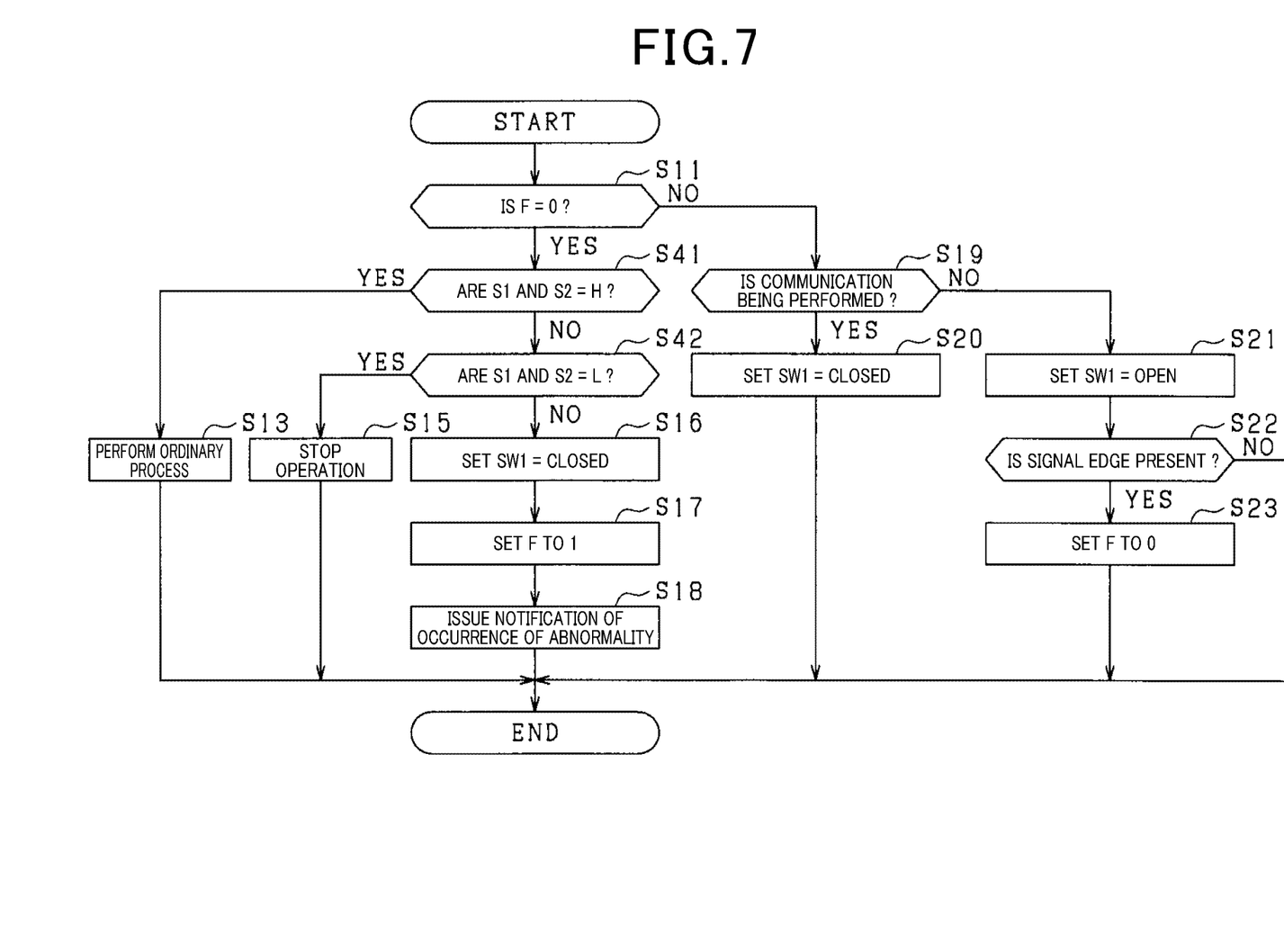
FIG. 7 is a flowchart of the steps in a process for switch control according to a third embodiment.

FIG. 7 is a flowchart of the steps in a process for switch control. The present process is repeatedly performed by the power supply control apparatus 40 at a predetermined cycle instead of FIG. 2, described above. In FIG. 7, as a difference with FIG. 2, instead of the processes at steps S12 and S14, processes at steps S41 and S42 are provided.

In FIG. 7, when determined that the error flag F is set to 0, at step S41, the power supply control apparatus 40 determines whether the startup signals S1 and S2 are both the high level. In addition, at step S42, the power supply control apparatus 40 determines whether the startup signals S1 and S2 are both the low level. Then, when determined that the startup signals S1 and S2 are both the high level (YES at step S41), at step S13, the power supply control apparatus 40 performs ordinary control as control of the switches SW1 to SW4. In addition, when determined that the startup signals S1 and S2 are both the low level (YES at step S42), at step S15, the power supply control apparatus 40 transitions the power supply control apparatus 40 itself to a state in which operation is stopped.

Furthermore, when determined that only either of the startup signals S1 and S2 is the low level (NO at both steps S41 and S42), at step S16, the power supply control apparatus 40 sets the first switch SW1, among the switches SW1 to SW4, to the closed state and the other second to fourth switches SW2 to SW4 to the open state. At subsequent step S17, the power supply control apparatus 40 sets the error flag F to 1. In this case, as described above, even when the start signal falls to the low level, the operation of the power supply control apparatus 40 is not stopped and the operating state thereof is continued.

In the configuration in which the startup signals S1 and S2 are respectively received by the power supply control apparatus 40 via two routes, for example, as a result of a portion of the connectors becoming detached, input of a portion of the startup signals may be stopped. Input of the other startup signals may be continued. Therefore, the startup signal abnormality can be appropriately determined to have occurred by input of only of a portion of the startup signals S1 and S2 of the two routes being determined to have stopped.

Here, the configuration may be such that either of the startup signals S1 and S2 is a main startup signal, and the other is a sub startup signal. When the main startup signal is the high level, the ordinary process is performed regardless of the sub startup signal. In addition, when the main startup signal is the low level and the sub startup signal is the high level, the startup signal abnormality is determined to have occurred (error flag F=1). Furthermore, in addition to the configuration in which the startup signals are received by the power supply control apparatus 40 via two routes, a configuration in which startup signals are received by the power supply control apparatus 40 via three or more routes is also possible.

Other Embodiments

For example, the above-described embodiments may be modified in the following manner.

The configuration may be such that, in the power supply control apparatus 40, the determination process (see FIG. 2) in which the startup signal abnormality is determined to have occurred when input of the startup signal is stopped in a state in which communication with another control apparatus (ECU 50) is being performed, and the determination process (see FIG. 7) in which the startup signal abnormality is determined to have occurred when input of only of a portion of the startup signals of a plurality of routes is stopped, are both performed. That is, the power supply control apparatus 40 operates the first switch SW1 to the closed state when determined that the startup signal abnormality has occurred in either of the two determination processes described above.

According to the above-described embodiments, after the startup signal abnormality is determined to have occurred, when communication is being performed, the first switch SW1 is set to the closed state. When communication is not being performed, the first switch SW1 is set to the open state. However, this configuration may be modified. The configuration may be such that, after the startup signal abnormality is determined to have occurred, the first switch SW1 is held in the closed state regardless of the communication state.

The configuration may be such that a forcible startup signal is periodically generated while the IG switch 18 is off, that is, while the vehicle is stopped. The power supply control apparatus 40 performs abnormality determination as a result of the forcible startup signal. Here, when the startup signal abnormality is determined to have occurred while the IG switch 18 is off, the first switch SW1 may be closed (turned on) in preparation for the next IG-on.

The power supply switch of the vehicle may be a switch other than the IG switch 18. For example, the power supply switch may be an accessory (ACC) switch. In addition, the configuration may be such that the startup signal is supplied to the power supply control apparatus 40 in accompaniment with the ACC switch being operated to on. The configuration may be such that a route through which the startup signal is supplied the power supply control apparatus 40 in accompaniment with the IG switch being operated to on and a route through which the startup signal is supplied in accompaniment with the ACC switch being operated to on are provided, and the startup signals are received by the power supply control apparatus 40 from these routes.

According to the above-described embodiments, in the battery unit U, the third switch SW3 and the fourth switch SW4 for driving the electric load are provided. However, this configuration may be modified. For example, the battery unit U may be configured such that the switches SW3 and SW4 are not included. Furthermore, the configuration may be such that the battery unit U only includes the first switch SW1 among the switches SW1 to SW4.

The power supply system is not limited to that which includes the lead storage battery 11 and the lithium ion storage battery 12 as the first storage battery and the second storage battery. For example, the configuration may be such that, instead of either of the lead storage battery 11 and the lithium ion storage battery 12, another secondary battery such as a nickel-hydrogen storage battery is used. In addition, the first storage battery and the second storage battery may both be the lead storage battery or the lithium ion storage battery. However, a high-efficiency storage battery that has high charging and discharge efficiency is preferably used as the second storage battery.

According to the above-described embodiments, the rotating electric machine 16 that provides the power generation function and the power running function is used as the power generator. However, this configuration may be modified. A power generator such as an alternator that only provides the power generation function can also be used.

The present disclosure is not limited to an in-vehicle power supply system and can also be applied to a power supply system other than the in-vehicle power supply system.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power supply control apparatus for a power supply system, the power supply system including a first storage battery and a second storage battery that are connected in parallel to a power generator, and a switch on an electrical path that connects the first storage battery and the second storage battery, the switch being between the first storage battery and a connection point on the electrical path to which the power generator is connected, wherein the power supply control apparatus is configured to be started by input of a startup signal from outside the power supply control apparatus and control open and closed states of the switch, wherein the power supply control apparatus is configured to communicate with an other control apparatus via a communication line, the other control apparatus configured to be started by the startup signal, the power supply control apparatus comprising:
a processor configured to:
determine occurrence of a startup signal abnormality due to the startup signal not being received by the power supply control apparatus in a normal manner;
determine if the processor is in communication with the other control apparatus if the startup signal abnormality occurs; and
operate the switch to a closed state in response to a determination (1) of the occurrence of the startup signal abnormality and (2) communication between the processor and the other control apparatus.

2. The power supply control apparatus according to claim 1, wherein:
the power supply control apparatus is applied to an in-vehicle power supply system that is mounted in a vehicle and in which communication via the communication line is performed in accompaniment with a power supply switch of the vehicle being turned on and the startup signal is supplied to the power supply control apparatus in accompaniment with the power supply switch being turned on; and
after the processor determines that the startup signal abnormality has occurred, the processor sets the switch to the closed state as a result of communication with the other control apparatus being performed and sets the switch to an open state as a result of communication with the other control apparatus not being performed.

3. The power supply control apparatus according to claim 2, wherein:
the processor is configured to determine that input of the startup signal has returned to normal based on the startup signal being received by the power supply control apparatus in a state in which communication with the other control apparatus is not being performed after the startup signal abnormality is determined to have occurred.

4. The power supply control apparatus according to claim 3, wherein:
the processor is configured to determine that input of the startup signal has returned to normal based on an amount of time within which input of the startup signal is continued being equal to or greater than a predetermined amount of time, in response to the startup signal being subsequently received by the power supply control apparatus after the startup signal abnormality is determined to have occurred.

5. The power supply control apparatus according to claim 4, wherein:
the startup signal is provided as a plurality of startup signals respectively received by the power supply control apparatus from a plurality of routes; and
the processor is configured to determine that the startup signal abnormality has occurred in response to input of at least a portion of the startup signals being stopped.

6. The power supply control apparatus according to claim 5, wherein:
the power supply control apparatus is applied to the power supply system that includes the switch as a first switch, and a second switch that is provided between the second storage battery and the connection point on the electrical path; and
the processor is configured to operate the first switch to the closed state and the second switch to the open state in response to the startup signal abnormality being determined to have occurred.

7. The power supply control apparatus according to claim 1, wherein:
the power supply control apparatus is applied to an in-vehicle power supply system that is mounted in a vehicle and in which communication via the communication line is performed in accompaniment with a power supply switch of the vehicle being turned on and the startup signal is supplied to the power supply control apparatus in accompaniment with the power supply switch being turned on; and
the processor is configured to determine that input of the startup signal has returned to normal based on the startup signal being received by the power supply control apparatus in a state in which communication with the other control apparatus is not being performed after the startup signal abnormality is determined to have occurred.

8. The power supply control apparatus according to claim 1, wherein:
the processor is configured to determine that input of the startup signal has returned to normal based on an amount of time within which input of the startup signal is continued being equal to or greater than a predetermined amount of time, in response to the startup signal being subsequently received by the power supply control apparatus after the startup signal abnormality is determined to have occurred.

9. The power supply control apparatus according to claim 1, wherein:
the startup signal is provided as a plurality of startup signals respectively received by the power supply control apparatus from a plurality of routes; and
the processor is configured to determine that the startup signal abnormality has occurred in response to input of at least a portion of the startup signals being stopped.

10. The power supply control apparatus according to claim 1, wherein:
the power supply control apparatus is applied to the power supply system that includes the switch as a first switch, and a second switch that is provided between the second storage battery and the connection point on the electrical path; and
the processor is configured to operate the first switch to the closed state and the second switch to the open state in response to the startup signal abnormality being determined to have occurred.

11. A battery unit comprising:
a power supply control apparatus that is applied to a power supply system, the power supply system including: a first storage battery and a second storage battery that are connected in parallel to a power generator; and a switch on an electrical path that connects the first storage battery and the second storage battery, the switch being between the first storage battery and a connection point on the electrical path to which the power generator is connected, wherein the power supply control apparatus is started by input of a startup signal from outside the power supply control apparatus and controls open and closed states of the switch, wherein the power supply control apparatus is configured to communicate with an other control apparatus via a communication line, the other control apparatus configured to be started by the startup signal, the power supply control apparatus comprising
a processor configured to:
   determine whether a startup signal abnormality due to the startup signal not being received by the power supply control apparatus in a normal manner has occurred;
   determine if the processor is in communication with the other control apparatus; and
   operate the switch to a closed state in response to the startup signal abnormality being determined to have occurred and a determination that the processor is in communication with the other control apparatus;
a first terminal that is connected to the first storage battery;
a second terminal that is connected to the power generator;
a signal input terminal to which the startup signal is received; and
a connection path that connects the first terminal and the second terminal, wherein
the switch is provided on the connection path, and
the second storage battery is provided in the battery unit.

* * * * *